United States Patent [19]
Ando et al.

[11] Patent Number: 4,493,534
[45] Date of Patent: Jan. 15, 1985

[54] FOCUS ADJUSTING DEVICE FOR CAMERA HAVING VARIFOCAL OPTICAL SYSTEM

[75] Inventors: Makoto Ando; Yukio Miki, both of Sakai, Japan

[73] Assignee: Minolta Camera Kabushiki Kaisha, Osaka, Japan

[21] Appl. No.: 351,958

[22] Filed: Feb. 24, 1982

[30] Foreign Application Priority Data

Mar. 6, 1981 [JP] Japan .................................. 56-32703

[51] Int. Cl.³ ........................... G02B 7/10; G02B 7/11
[52] U.S. Cl. ..................................... 350/429; 350/255
[58] Field of Search ......................... 350/429, 430, 255

[56] References Cited

U.S. PATENT DOCUMENTS 3,850,507  11/1974  Uesugi ................................. 350/429
3,930,720   1/1976  Uesugi ................................. 350/255

FOREIGN PATENT DOCUMENTS 1465229   1/1967  France ................................. 350/429

Primary Examiner—Jon W. Henry
Attorney, Agent, or Firm—Watson, Cole, Grindle & Watson

[57] ABSTRACT

A focus adjusting device for a camera having a varifocal optical system includes a pivotal member having a focusing guiding slot. The pivotal member is movable about a fixed pivot on the camera body. A guide pin fits in the guiding slot of the pivotal member and zoom information transmitting means are provided for moving the guide pin in accordance with the focal length of a zoom lens unit to vary the distance from the pivot to the pin. Focusing means are included for varying the position of the pivotal member according to a set subject distance along with focus coupling means for moving a focus lens unit in corresponding relation to the position of the guide pin with respect to the direction of the optical axis. The device, which is compact, compensates for differences in the focusing position of the focus lens unit due to variations in the focal length.

8 Claims, 6 Drawing Figures

FOCUS ADJUSTING DEVICE FOR CAMERA HAVING VARIFOCAL OPTICAL SYSTEM

BACKGROUND OF THE INVENTION

1. Field of the Invention

The present invention relates to a focus adjusting device for cameras having a varifocal optical system in which the focusing position for a subject at a given distance alters with the movement of a zooming lens group of the system for varying its focal length, and the amount of focusing movement of a focusing lens group of the system varies with the focal length.

2. Description of the Prior Art

As disclosed in U.S. Pat. No. 3,850,507 and U.S. Pat. No. 3,930,720, there have been proposed focus adjusting devices for such varifocal optical systems which are capable of adjusting the position of the focusing lens group with zooming operation to compensate for the variation in the focusing position of the lens group. These focus adjusting devices are provided circumferentially within a lens barrel or provided in a portion of a lens barrel radially projected therefrom. Accordingly the lens barrel has an increased outside diameter, or the barrel is partly bulged to accommodate the device and therefore has a peculiar shape which appears unsightly. The diametrically or locally enlarged lens barrel is difficult to handle and inconvenient to use. Moreover neither of the focus adjusting devices is suited to automatic focusing because it is extremely difficult to couple the device to an automatic focusing means incorporated in a camera body.

SUMMARY OF THE INVENTION

The main object of the present invention is to provide a focus adjusting device for cameras having a varifocal optical system of the described type, which is adapted to compensate for variation in the focusing position of the focusing lens group due to variations in the focal length without diametrically or locally enlarging the lens barrel and therefore without impairing its handleability.

Other objects and features of the invention will become apparent from the following description of an embodiment with reference to the accompanying drawings.

DESCRIPTION OF THE PREFERRED EMBODIMENT

Figure 1:
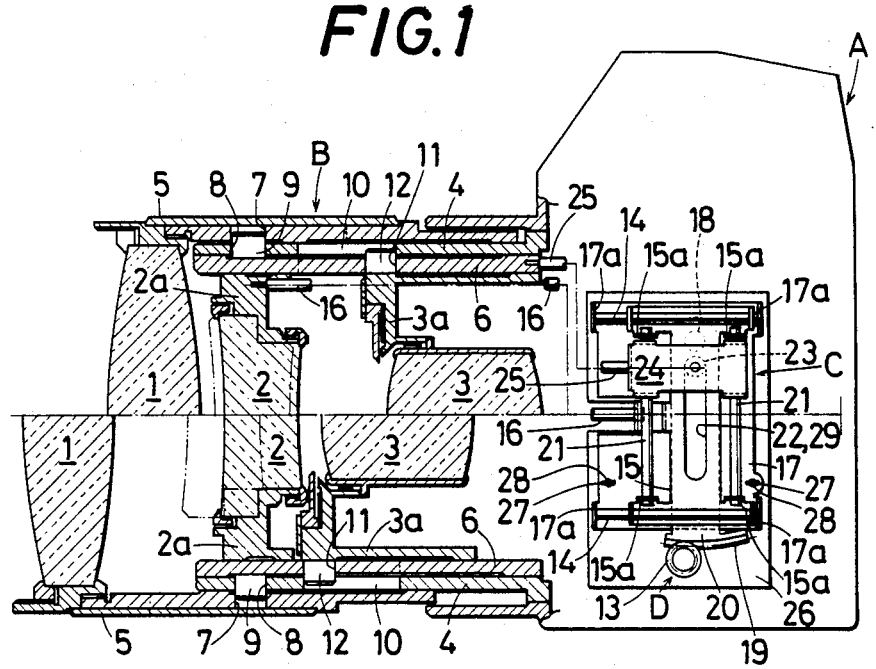
FIG. 1 is a view in vertical section showing a single-lens reflex camera including a varifocal lens system and an embodiment of the invention therefor, the lens system being shown at a wide-angle position above the optical axis of the barrel and at a telephoto position below the optical axis.

FIG. 1 shows a camera body A fixedly provided with a varifocal lens barrel B. For a simplified description, the lens system in the barrel B is shown as being composed of three lens groups, i.e. front, intermediate and rear groups. The lens system is of the internal focusing type wherein only the intermediate lens group 2 is moved for focusing. The front lens group 1 and the rear lens group 3 serve as zooming lens groups. A fixed cylinder 4 fixedly mounted on the camera body A has externally fitted therearound a zoom control ring 5 which is made slidable only axially thereof by a known straightforward mechanism comprising, for example, a key and a straight key groove. The front lens group 1 is held in the forward end of the ring 5. A frame 3a holding the rear lens group 3 therein is axially slidably retained in a zoom ring 6 rotatably fitted in the fixed cylinder 4.

Pins 9 formed on the zoom ring 6 are engaged in the cam groove (or lead cam groove) 7 of the control ring 5 and the circumferential groove 8 of the fixed cylinder 4 while pins 12 formed on the lens holding frame 3a are engaged in the axial groove 10 of the fixed cylinder 4 and the cam groove 11 of the zoom ring 6. When the control ring 5 is moved axially thereof, the front lens group 1 moves therewith along the optical axis and the zoom ring 6 is rotated through the engagement of the pins 9 with the cam groove 7, being guided by circumferential groove 8. In response to this rotation of the zoom ring 6, the lens holding frame 3a is moved through the engagement of the pins 12 and the cam groove 11, being guided by the axial groove 10. In this way, the front and rear lens groups 1 and 3 are movable for zooming between the wide-angle position on the upper side of the optical axis shown in FIG. 1 and the telephoto position on the lower side of the optical axis shown in FIG. 1.

On the other hand, a frame 2a holding the intermediate lens group 2 for focusing is retained by the zoom ring 6 and is rotatable and axially movable relative to the zoom ring 6. The intermediate lens group 2 is moved along the optical axis for focusing. With the lens system of the present embodiment wherein the front lens group for zooming is positioned in front of the focusing lens group, the focal point for the same subject would shift, if the focusing lens group were held at rest upon zooming operation. In other words, the amount of the axial movement of the focusing lens group for the change of the subject distance from infinity to short distance is to be varied with the zooming. With the present embodiment, the amount of axial movement of the focusing lens group, i.e. the intermediate lens group 2, from the infinity focused position shown in full lines to the short-distance focused position shown in phantom lines is several times larger at the wide-angle position than at the telephoto position.

This means that when the optical system is focused on a subject and thereafter moved for zooming with the focusing lens group held at rest, the system must be readjusted for focusing. Without the readjustment, a viewfinder image of the subject is remarkably defocused when the zooming lens groups are moved to the large extent.

To eliminate the problem due to the variations in the amount of axial movement of the focusing lens group caused by the zooming operation, the camera body A has incorporated therein focusing lens group adjusting means C for correcting the position of the focusing lens group during zooming operation to maintain the focal point of the optical system at a constant position and for varying the amount of movement of the focusing lens group in accordance with the position of the zooming lens groups. This adjusting means C is provided in the transmission system by which a driving gear 13 is coupled to the focusing lens group. The driving gear 13 is a mechanical output portion of an automatic focusing assembly D provided within the camera body A. It is to be noted that the automatic focusing assembly D is not shown except the driving gear 13 because it is of a known construction.

The frame 2a for holding the intermediate lens group is connected by a rod 16 to a driven plate 15 which is supported by a pair of upper and lower guide bars 14 within the camera body A so as to be movable along the optical axis. The frame 2a is movable with the plate 15 along the optical axis. A base plate 17 has lugs 17a at its four corners for supporting the guide bars 14. A lever member 20 has one end supported by a pivot 18 on the base plate 17. At the other end, the member 20 has a sector gear 19 meshing with the driving gear 13. A coupling plate 24 for zooming is supported by a pair of front and rear guide bars 21 on lugs 15a at the four corners of the driven plate 15 and is movable in directions at right angles to the optical axis. The coupling plate 24 has a focusing guiding pin 23 engaged in a focusing guiding slot 22 formed in the lever member 20 longitudinally thereof and engaged in a slot 29 formed in the driven plate 15 to extend in the direction perpendicular to the direction of movement of the driven plate 15. The pin 23 is movable along the slot 22. The coupling plate 24 is coupled by a rod 25 to the zoom ring 6 rotatable in response to zooming operation. The plate 24 is reciprocatingly movable in response to the rotation of the ring 6.

The connecting rod 16 has one end attached to the frame 2a for example by screwing and is provided at the other end with a diametrically small portion 16a engaged in a groove 15c which is formed by a bifurcated lug 15b of the driven plate 15, whereby the intermediate lens group 2 is made movable with the driven plate 15 along the optical axis. The rod 16 extends through an axial hole or cutout groove (not shown) formed in the frame 3a holding the rear lens group 3, whereby the focusing movement given to the driven plate 15 is transmitted to the intermediate lens group 2 without influencing the rear lens group 3 and without being influenced by the rear lens group 3. The rod 16 prevents the intermediate lens group 2 from rotating uselessly because the rod 16 extends through the rear lens group holding frame 3a which moves only along the optical axis.

Another connecting rod 25 has one end attached, as by screwing, to the rear end of the zoom ring 6 positioned inside the camera body A. The other end of rod 25 is engaged in a groove 24b of a bifurcated lug 24a of the coupling plate 24 and slidable along the length of the groove 24b on the rotation of the zoom lens 6 to make the coupling plate 24 reciprocatingly movable.

Within the camera body A, the base plate 17 is attached to a side plate 26 of a mirror box by screws 28 engaged in slits 27 extending parallel to the optical axis. Thus the position of the base plate 17 is adjustable along the optical axis. The adjusting means C is movable along the optical axis as a whole by this adjustment, whereby the intermediate lens group 2 is movable along the optical axis. This facilitates the adjustment of the optical system during assembly. The rod 25 axially slidably fitted in the groove 24b permits this adjustment. The driven plate 15 has a slot 29 for permitting the movement of the pin 23. The pin 23 is not necessarily in close contact with side walls of the slot 29. The slot 29 can be dispensed with in some arrangement of the members.

Figure 2:
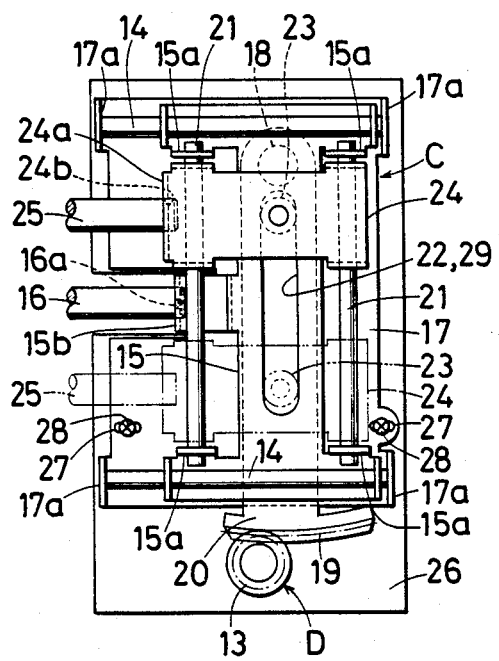
FIGS. 2 to 4 are enlarged side elevations showing the operation of the embodiment.
Figure 5:
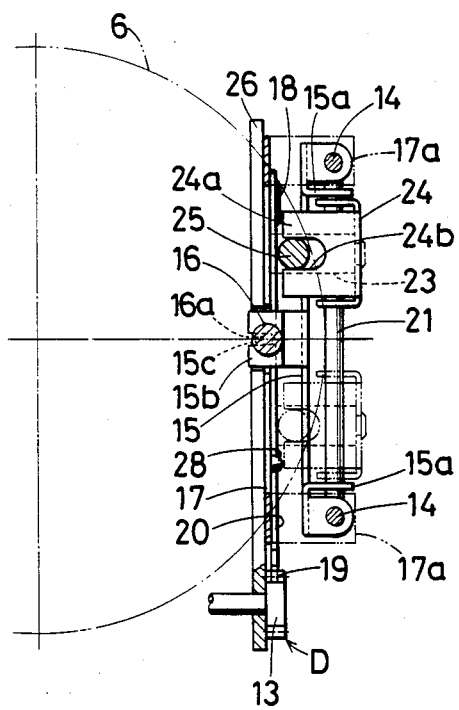
FIG. 5 is an enlarged front view showing the embodiment.
Figure 6:
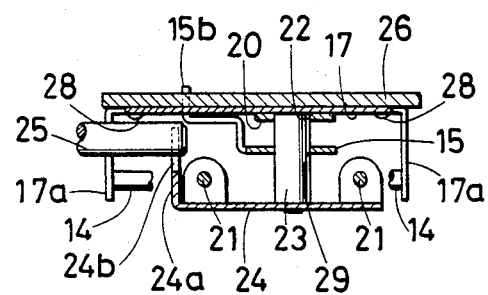
FIG. 6 is a fragmentary plan view in cross section showing the same.

The lens system shown on the upper side of the optical axis in FIG. 1 is at its wide-angle position as focused on infinity. In this case, the focusing guiding slot 22 of the lever member 20 is positioned at right angles to the optical axis. On the other hand, the coupling plate 24 for zooming is in its raised position indicated in full lines (FIGS. 1, 2 and 5). When the control ring 5 is advanced in this state for zooming to the telephoto position on the lower side of the axis shown in FIG. 1, the zoom ring 6 is rotated for the movement of the zooming lens groups. The rotation of the zoom ring 6 at this time causes the connecting rod 25 to shift the coupling plate 24 from the full line position to the phantom line position in FIGS. 2 and 5. With this movement, the coupling plate 24 moves the focusing guiding pin 23 through the slot 22 from the full line position to the phantom line position in FIG. 2, but since the focusing guiding slot 22 is perpendicular to the optical axis, the pin 23 and the plate 24 are not shifted along the optical axis and produce no influence on the focusing system while merely permitting zooming from the wide-angle position to the telephoto position. Accordingly the intermediate lens group 2 remains in the full line position of FIG. 1.

Figure 3:
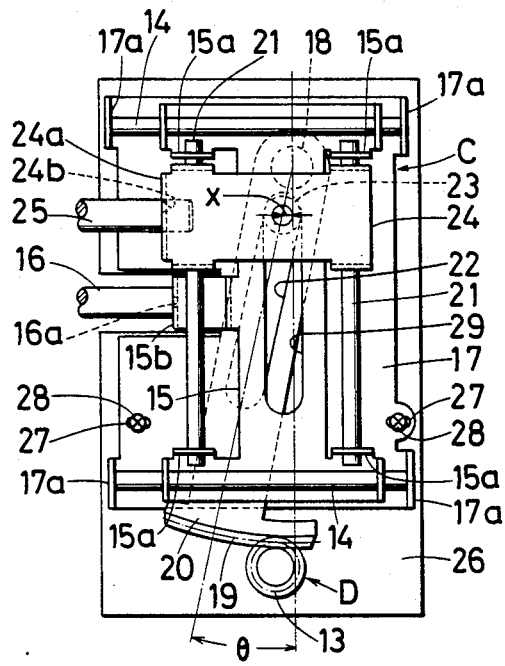
Figure 4:
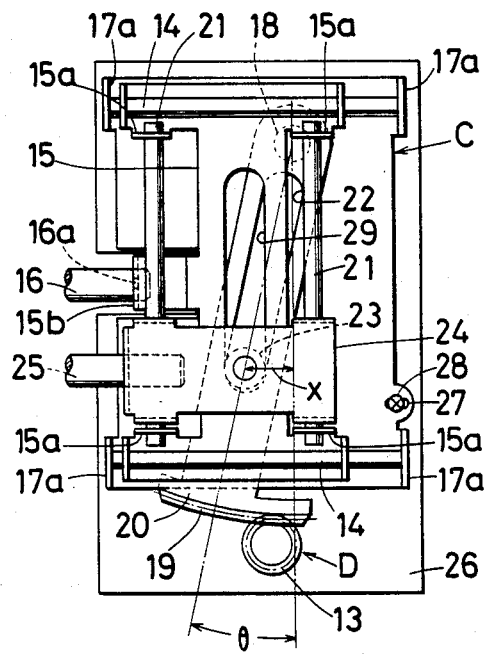

However, if the focusing position is set even slightly toward the short-distance position from the infinity position, the lever member 20 perpendicular to the optical axis in FIGS. 1 and 2 is turned to an inclined position as shown in FIGS. 3 and 4, with the result that the driven plate 15 which is movable with the coupling plate 24 along the optical axis is moved leftward a corresponding amount by the guiding pin 23 in the slot 22 and the zooming coupling plate 24. The intermediate lens group 2 is moved with the driven plate 15 to an adjusted position in accordance with the focusing movement given by the driving gear 13.

However, the amount of movement, X, of the driven plate 15 caused by the pin 23 along the optical axis due to the angle of inclination, $\theta$, of the lever member 20 increases as the pin 23 in the slot 22 moves away from the pivot 18 of the lever member 20, in other words, as the coupling plate 24 is moved toward the telephoto position of FIG. 4 away from the wide-angle position of FIG. 3 by zooming operation. Thus, although the amount of axial movement of the focusing lens group varies with zooming, the amount of pivotal movement of the lever member 20 required for the same subject is constant at all times. The present arrangement therefore simplifies the detection of focused state and focusing control when an automatic focusing system is used. For example, the present device eliminates the likelihood that when a stepping motor is used for focusing, the amount of one step inherent in the motor will become exceedingly small at the telephoto position and excessively large at the wide-angle position, or the likelihood to be involved in any focusing drive system that a difference in the required amount of focusing control between the telephoto position and the wide-angle position will produce a variation in the period of time or drive force needed for focusing control.

Further when the present device is adapted for a manual focusing system, the system is made easy to handle since the amount of control required for a particular subject distance is definite. The user may focus the optical system at a position other than the infinity focused position, for example, at the short-distance position shown in FIGS. 3 and 4 and thereafter axially shift the zoom control ring 5 to alter the zoom ratio for the subject on which the system has been focused. Even in such a case, the focal point can be maintained at a definite position. That is, as the pin 23 and the coupling plate 24 are moved perpendicular to the optical axis, they are moved also along the axis by being guided by the slot 22 which is inclined at this time, consequently adjusting the position of the intermediate lens group 2 in corresponding relation to the variation in the amount of zooming.

Briefly, the present embodiment comprises a focusing lens group adjusting means C disposed within the camera body A to the rear of the zoom lens barrel B and includes a lever member 20 pivotally movable relative to the stationary portion of the camera body by a focusing control. A driven plate 15 is movable with the focusing lens group along the optical axis, and a zooming coupling plate 24 is movable perpendicular to the optical axis with zooming to alter the coupling relation between the lever member 20 and the driven plate 15. With a simple and compact arrangement, the embodiment is adapted to compensate for variations in the focusing position of the focusing lens group due to variations in the focal length without increasing the size of the zoom lens barrel.

In a varifocal lens system of the type wherein at least part of a focusing movable lens group is disposed to the rear of the foremost zooming lenses (including those wherein a movable lens is used commonly for zooming and focusing), the mode in which the focusing position of the focusing lens group is altered by zooming differs from system to system according to the specific design of the lens system. However, the present invention is of course applicable to such various varifocal lens systems by suitably determining the shape of the focusing guiding slot, the angle of inclination thereof with respect to a specific focusing position or the ratio of variation of the inclination angle relative to the amount of focusing.

When the adjusting means C for the focusing lens group is in the form of a flat superposed assembly of three plate members including the lever member 20 and provided on a base plate as in the illustrated embodiment, the adjusting means C is not bulky in its entirety and is easy to incorporate into the camera body A. Furthermore, the adjusting means can be easily installed in a conventional body, for example, as attached to the side plate 26 of the mirror box. Thus the adjusting means, which is compact, will not make the camera large-sized. The mode of movement of the components, the combination thereof, etc. can be designed as desired.

For a camera having a varifocal lens system in which the focusing position of a focusing movable lens at the same subject distance alters with variations in the focal length, the present invention provides a focus adjusting device characterized by focusing lens group adjusting means disposed within the body of the camera to the rear of the zoom lens system, and movable with focusing control. The focusing lens group adjusting means is adapted to adjust the focusing position of a group of focusing lenses by zooming. Zooming information transmitting means is provided for transmitting the zooming information of a group of zoom lenses to the adjusting means, and focusing information transmitting means is provided for transmitting the focusing information of the adjusting means to the zoom lens group. Accordingly, the zoom lens barrel needs only to be so adapted that the focusing and zooming lens groups are coupled to the adjusting means within the camera body by the zooming and focusing information transmitting means. Accordingly, the barrel will not be diametrically enlarged or locally bulged to an unsightly shape for adjusting the focusing position of the focusing lens group during zooming, whereas an increased diameter or local protrusion would make the barrel difficult to handle or use.

When the adjusting means is made movable relative to the stationary portion of the camera and the focusing lens group is made movable by the movement of the adjusting means, the initial position of the lens group is adjustable within the camera body. The error involved in assembly can also be corrected. Further, since the position of the focusing lens group is adjusted with zooming by the adjusting means which is provided within the camera body, the adjusting means can be easily coupled to the autofocusing assembly which is disposed also within the camera body in view of the space needed and in connection with other mechanisms. The amount of focusing control is always constant for a given subject distance whether at the telephoto position or at the wide-angle position. This eliminates the likelihood that when a stepping motor is used for autofocusing, the amount of the movement of the adjusting means corresponding to the amount of one step inherent in the motor will become exceedingly small at the telephoto position and exceedingly large at the wide-angle position, which facilitates detection of the focused state and focusing control. The above feature also eliminates the likelihood in any focusing drive system that a difference in the required amount of focusing control between the telephoto position and the wide-angle position will produce a variation in the time or drive force needed for focusing control to render the system unserviceable as desired.

Obviously, numerous modifications and variations of the present invention are possible in light of the above teachings. It is therefore to be understood that within the scope of the appended claims, the invention may be practiced otherwise than as specifically described herein.

What is claimed is:

1. A camera for use with a lens barrel including a varifocal optical system having an optical axis and a focal length and in which a focusing position for a subject at a given distance alters with a movement of first lenses for varying said focal length and in which a movement of second lenses for focusing varies with said focal length, said camera comprising:

a camera body having a front portion on which said lens barrel is attached; and a focus adjusting device provided in said camera body, wherein said focus adjusting device includes;

focus coupling means coupled with said lens barrel and movable parallel to the optical axis of said varifocal optical system for moving said second lenses for focusing;

a pivotable member pivoted about a fixed pivot on said camera body for pivoting movement in a plane parallel to said optical axis and having an elongated focus guiding slot extending away from said fixed pivot;

a focus guiding member engaging said focus guiding slot and coupled with said focus coupling means to move therewith parallel to said optical axis;

focal length information transmitting means coupled with said lens barrel for moving said focus guiding member along said focus guiding slot in accordance with the focal length of said varifocal optical system to vary the distance from said fixed pivot to said focus guiding member; and focusing means for pivoting said pivotable member to vary the inclination of said focus guiding slot in said plane parallel to said optical axis, the pivoting movement of said pivotable member causing movement of said focus coupling means parallel to said optical axis through engagement of said focus guiding member with said focus guiding slot and through coupling of said focus guiding member with said focus coupling means, such that movement of said focus coupling means in the direction parallel to said optical axis is determined by the inclination of said focus guiding slot and the distance from said fixed pivot to said focus guiding member.

2. A camera as defined in claim 1, wherein said focus coupling means includes a driven plate supported on said camera body to be movable only parallel to said optical axis and having an elongated slot extending in a direction perpendicular to said direction of movement of said driven plate, said focus guiding member also engaging said slot of said driven plate.

3. A camera as defined in claim 2, wherein said focal length information transmitting means includes a coupling plate supported on said driven plate to be movable only perpendicular to said direction of movement of said driven plate and a member for moving said coupling plate in the direction perpendicular to said direction of movement of said driven plate in accordance with the focal length of said varifocal optical system, said focus guiding member comprising a pin fixed to said coupling plate.

4. A camera as defined in claim 1, further comprising a mirror box provided in said camera body, said mirror box having a side wall on which said focus adjusting device is provided.

5. A camera as defined in claim 4, further comprising a base plate provided on said side wall of said mirror box and supporting said focus adjusting device, and a means for adjustably fixing said base plate to said side wall of said mirror box such that the position of said base plate in the direction parallel to said optical axis is adjustable upon assembly of said focus adjusting device into said camera body.

6. A camera as defined in claim 1, further comprising an autofocusing device which includes said focusing means to control the pivoting movement of said pivotable member automatically.

7. A camera as defined in claim 1, wherein said varifocal optical system comprises a zoom lens in which said first lenses for varying the focal length comprise lenses for zooming.

8. A camera as defined in claim 7, wherein said lens barrel includes:

a fixed cylinder fixed to said camera body;

a zoom control ring manually shiftable relative to said fixed cylinder along said optical axis; and a zoom ring coupled with said zoom control ring to rotate relative to said fixed cylinder about said optical axis in accordance with a shift of said zoom control ring for causing movement of said first lenses for zooming, and wherein said focal length information transmitting means includes an information transmitting member coupled with said zoom ring and said focus guiding member such that the rotation of said zoom ring causes movement of said focus guiding member along said focus guiding slot.

* * * * *